US010189036B2

(12) United States Patent
Steffen

(10) Patent No.: US 10,189,036 B2
(45) Date of Patent: Jan. 29, 2019

(54) ELECTRIC CARTRIDGE STYLE PRESSURE WASHER HEATER MODULE

(71) Applicant: Mi-T-M Corporation, Peosta, IA (US)

(72) Inventor: Michael John Steffen, Dubuque, IA (US)

(73) Assignee: MI-T-M Corporation, Peosta, IA (US)

( * ) Notice: Subject to any disclaimer, the term of this patent is extended or adjusted under 35 U.S.C. 154(b) by 0 days.

(21) Appl. No.: 15/701,073

(22) Filed: Sep. 11, 2017

(65) Prior Publication Data

US 2018/0071759 A1 Mar. 15, 2018

Related U.S. Application Data

(60) Provisional application No. 62/385,502, filed on Sep. 9, 2016.

(51) Int. Cl.

| | |
|---|---|
| ***A47J 31/00*** | (2006.01) |
| ***B05B 7/22*** | (2006.01) |
| ***B08B 3/02*** | (2006.01) |
| ***B08B 3/10*** | (2006.01) |
| ***B05B 12/00*** | (2018.01) |

(52) U.S. Cl.

CPC .............. *B05B 7/22* (2013.01); *B05B 12/008* (2013.01); *B08B 3/026* (2013.01); *B08B 3/10* (2013.01); *B08B 2203/007* (2013.01); *B08B 2203/0217* (2013.01); *B08B 2203/0235* (2013.01); *B08B 2203/0282* (2013.01)

(58) Field of Classification Search

None

See application file for complete search history.

(56) References Cited

U.S. PATENT DOCUMENTS 2,861,838 A * 11/1958 Wyatt ..................... B08B 3/026 239/137
3,018,968 A * 1/1962 Levey ..................... B05B 9/002 137/341
4,552,162 A * 11/1985 Finger ..................... B08B 3/026 134/57 R
5,662,269 A * 9/1997 Francis ................... B08B 3/026 134/107
5,713,310 A * 2/1998 Lemke .................... B08B 3/026 122/18.4
5,897,297 A * 4/1999 Carter ..................... B08B 3/006 417/205
6,056,207 A * 5/2000 Larson .................... B05B 9/002 239/124
6,092,768 A * 7/2000 Larson .................... B08B 13/00 248/129

(Continued)

OTHER PUBLICATIONS

EPPS Electrically Heated Sales Brochure, Continuous Heated Water-No Emissions-No Fumes, 1 page, Nov. 17, 2016.
LANDA, EHW Series Sales Brochure, All-Electric Hot Water Pressure Washer, www.landa.com, 2 pages, Nov. 17, 2016.
Sioux EN-Series Sales Brochure, Sioux EN-Series All-Electric Steam Cleaners and Pressure Washers, www.sioux.com, pp. 1-4, 2015.

(Continued)

*Primary Examiner* — Thor Campbell
(74) *Attorney, Agent, or Firm* — McKee, Voorhees & Sease, PLC

(57) ABSTRACT

An all-electric pressure washer heater module having a heating coil and a heating element is disclosed. A system for all-electric pressure washing is further disclosure. In particular, the all-electric pressure washer heater module contains the heating element from exposure to corrosion and fouling.

19 Claims, 9 Drawing Sheets

(56) References Cited

U.S. PATENT DOCUMENTS

| | | | | |
|---|---|---|---|---|
| 6,176,251 | B1 * | 1/2001 | Borgogno | F04B 49/035 137/115.07 |
| 6,234,409 | B1 * | 5/2001 | Aslakson | B08B 3/026 239/146 |
| 6,289,177 | B1 * | 9/2001 | Finger | F24H 1/102 392/447 |
| 6,761,135 | B1 * | 7/2004 | Becktold | B08B 3/026 122/396 |
| 8,496,188 | B2 * | 7/2013 | Linton | B08B 3/026 137/563 |
| 8,960,565 | B2 * | 2/2015 | Rohner | B08B 3/02 137/334 |
| 9,528,722 | B1 | 12/2016 | Hansen et al. | |
| 2001/0022323 | A1 * | 9/2001 | Aslakson | B08B 3/026 239/172 |
| 2007/0296223 | A1 * | 12/2007 | Saylor | F02B 63/04 290/1 R |
| 2016/0167624 | A1 * | 6/2016 | Lansinger | B60S 1/488 219/202 |

OTHER PUBLICATIONS 32-1188 Cartridge Cutaway, 1 page. May 2015.

Tempco Circulation Heater Literature Manual, Section 3, www.tempco.com, pp. 1-74. Nov. 16, 2016.

Tempco, "Tubular Industrial Process", Circulation Heaters, Checklist—Selecting the Proper Circulation Heater, pp. 48-50. May 2015.

* cited by examiner

ELECTRIC CARTRIDGE STYLE PRESSURE WASHER HEATER MODULE

CROSS-REFERENCE TO RELATED APPLICATIONS

This application claims priority and is related to U.S. Provisional Application Ser. No. 62/385,502 filed on Sep. 9, 2016 and entitled ELECTRIC CARTRIDGE STYLE PRESSURE WASHER HEATER MODULE. The entire contents of this patent application are hereby expressly incorporated herein by reference including, without limitation, the specification, claims, and abstract, as well as any figures, tables, or drawings thereof.

FIELD OF THE DISCLOSURE

The disclosure relates to an all-electric heating module for a pressure washer as a well as a pressure washer having an all-electric heating module. In particular, the disclosure relates to a plurality of heating cartridges, with each cartridge having at least one coil and a heating element.

BACKGROUND OF THE DISCLOSURE

Conventional heating modules, such as shell and tube heat exchangers, coil heater, plate exchangers, and the like are traditionally used for heating liquids to various desired temperatures. Selected heating modules, must be able to provide a specified heat transfer while optimizing surface area and economics. Further, the heating modules should be able withstand stress due to high pressure, temperature, flow rates, and the like. In the situation where water is to be heated, hard water buildup, corrosion, and fouling become issues for the electrical components. Such occurrences decrease the efficiency of the heating module and require additional maintenance or energy input costs in order to achieve the desired amount of heat transfer. In the application of heating modules in consumer and commercial pressure washer systems, it is particularly favorable to have a heating module which is compact and reduces energy costs.

Thus, there is a need to provide a foul and corrosion resistant heating module in pressure washing systems which is compact and reduces energy costs. Accordingly, it is an objective of the claimed disclosure to develop such a heating module and a pressure washing system utilizing such a heating module.

Other objects, advantages and features of the present disclosure will become apparent from the following specification taken in conjunction with the accompanying figures.

BRIEF SUMMARY OF THE DISCLOSURE

An advantage of the disclosure is providing effective heating for a pressure washer system via an all-electric heating module. It is an advantage of the present disclosure that such heating module has increased fouling and corrosion resistance as a result of its design.

In an embodiment, the present disclosure provides a pressure washer system with an all-electric heater module for heating a liquid, comprising: a high-pressure pump; at least one heating cartridge in communication with the high-pressure pump; a trigger gun assembly in communication with the at least one heating module; wherein the liquid can flow from the high-pressure pump through the at least one heating module whereby the liquid is heated by the heating module prior to being sent to the trigger gun assembly. The system according to the disclosure, further comprises at least one additional heating cartridge in communication with a first heating cartridge. In a further embodiment, the heating cartridges are arranged in series. In a still further embodiment, the heating cartridges are arranged in parallel. The systems according to the disclosure further comprise a measurement module, wherein said measurement module is selected from the group consisting of flow, pressure, and temperature and combinations thereof. In further embodiment, the heating cartridge further comprises a coil in fluid communication with the high-pressure pump and a heating element, wherein the heating element is selected from the group consisting of an electric cartridge, electric blanket, an electric source, and combinations thereof. In an embodiment, the system further comprising a control software for operating said system to select a desired pressure, temperature, detergent composition and combinations thereof and further comprises a pressure unloader, a pressure regulating valve, a safety relief valve, a flow switch, and combinations thereof. In aspect of the disclosure, the heating module maintains a temperature from about 50° F. to about 320° F. and the high-pressure pump maintains a pressure of about 2000 psi to about 30000 psi, preferably from about 2000 psi to about 10000 psi, and more preferably from about 5000 psi to about 10000 psi.

In an embodiment, the present disclosure provides an all-electric pressure washer heater module, comprising: at least one heating cartridge; the cartridge having at least one coil; and the cartridge having a heating element. In a further embodiment, a liquid can flow through the at least one coil and the liquid is heated by the heating element, wherein the heating element is selected from the group consisting of an electric cartridge, electric blanket, an electric source, and combinations thereof. In a preferred embodiment, the heating element is an electric cartridge. In a still further preferred embodiment, the heating module maintains a temperature from about 50° F. to about 320° F. And in a preferred embodiment, the module further comprises a pressure unloader, a pressure regulating valve, a safety relief valve, a flow switch, and combinations thereof.

While multiple embodiments are disclosed, still other embodiments of the present disclosure will become apparent to those skilled in the art from the following detailed description, which shows and describes illustrative embodiments of the disclosure. Accordingly, the figures and detailed description are to be regarded as illustrative in nature and not restrictive.

Figure 1:
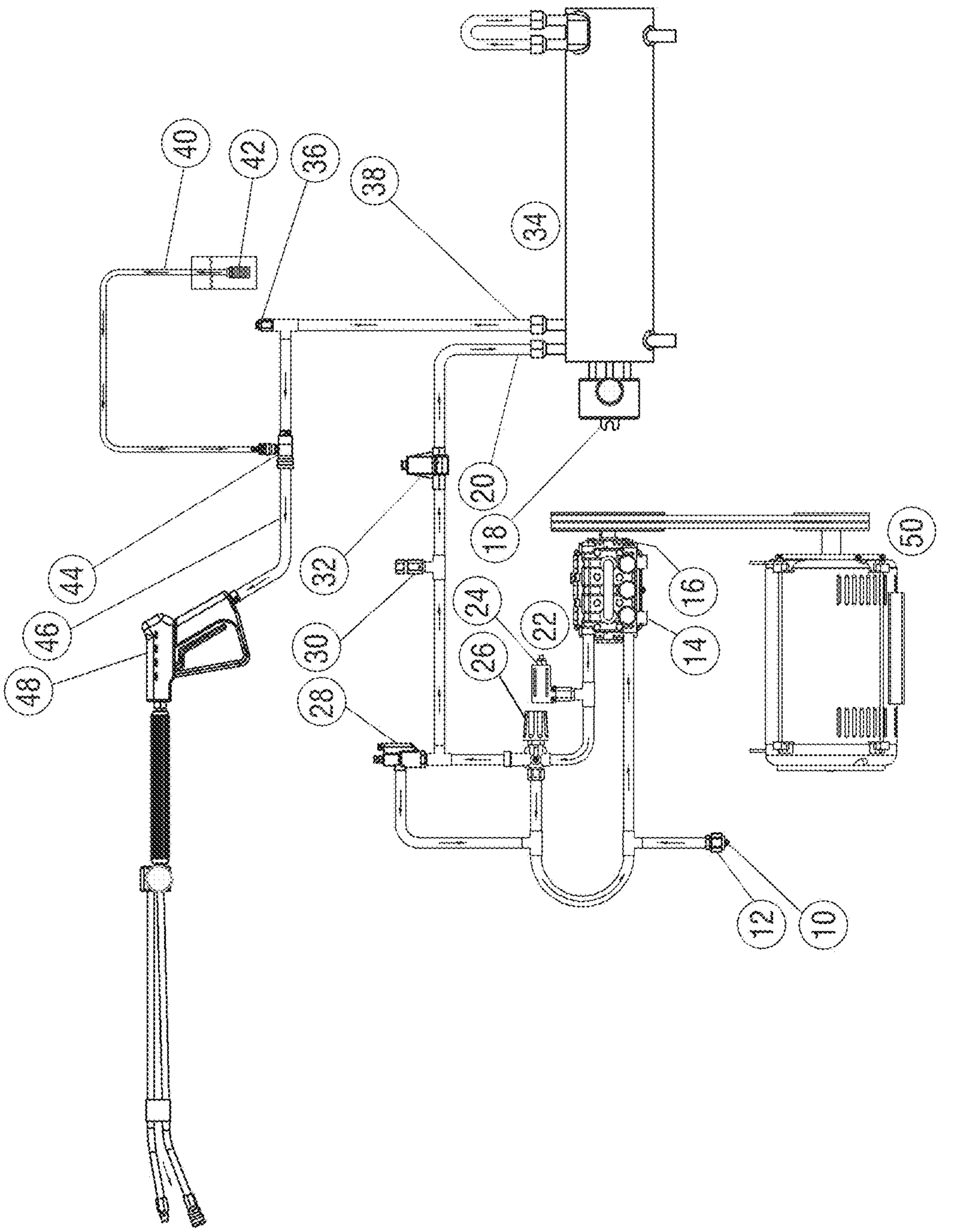
FIG. 1 shows an embodiment of the pressure washer system according to the present disclosure.

Various embodiments of the present disclosure are described in detail with reference to the figures, wherein like reference numerals represent like parts throughout the several views. Reference to various embodiments does not limit the scope of the disclosure. Figures represented herein are not limitations to the various embodiments according to the disclosure and are presented for exemplary illustration of the disclosure.

DETAILED DESCRIPTION OF THE PREFERRED EMBODIMENT

The present disclosure relates modules and methods related to pressure washer systems, and in particular all-electric heating modules in pressure washer systems. The modules and method have many advantages over conventional/existing/traditional heating modules in pressure washer systems. For example, the heating modules according to the present disclosure beneficially do not require fuel inputs and reduce fouling and corrosion of the heating elements in the system, as they are not exposed to high temperature waters and alkaline detergents. The embodiments of this disclosure are not limited to particular modules and methods, which can vary and are understood by skilled artisans.

It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

Definitions

So that the present disclosure may be more readily understood, certain terms are first defined. Unless defined otherwise, all technical and scientific terms used herein have the same meaning as commonly understood by one of ordinary skill in the art to which embodiments of the disclosure pertain. Many methods and materials similar, modified, or equivalent to those described herein can be used in the practice of the embodiments of the present disclosure without undue experimentation, the preferred materials and methods are described herein. In describing and claiming the embodiments of the present disclosure, the following terminology will be used in accordance with the definitions set out below.

The term "about," as used herein, refers to variation in the numerical quantity that can occur, for example, through typical measuring techniques and equipment, with respect to any quantifiable variable, including, but not limited to, mass, volume, time, distance, wave length, frequency, voltage, and current. Further, given scientific procedures used in the real world, there is certain inadvertent error and variation that is likely through differences in the manufacture and use of the module or carry out the methods and the like. The term "about" also encompasses these variations. Whether or not modified by the term "about," the claims include equivalents to the quantities.

The methods, systems, apparatuses, and compositions of the present disclosure may comprise, consist essentially of, or consist of the components and ingredients of the present disclosure as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

All publications and patent applications in this specification are indicative of the level of ordinary skill in the art to which this disclosure pertains. All publications and patent applications are herein incorporated by reference to the same extent as if each individual publication or patent application was specifically and individually indicated by reference.

Heating Modules and Systems

Referring to the drawings, one preferred embodiment of the disclosure employs an electric box assembly 50 which provides the electric input for the system and modules according to the disclosure as shown in FIG. 1 The electric box assembly may provide whatever power load is necessary to provided adequate and desired pressure via a high-pressure pump 14, as well as providing enough power necessary to achieve the desired temperature via the electric heating module 50. As shown in FIG. 1, water is fed to the pressure washer system via an inlet hose 12, which is in fluid communication with a source of water. Optionally, and in some preferred embodiments, the inlet hose 12 will include a water strainer 10 which removes particulate matter from the water inlet that would otherwise be damaging to the system. The water inlet hose 12 is also in fluid communication with the high-pressure pump 14. In high-pressure systems, the high-pressure pump 14 will include a heat dump valve 16, located on the high-pressure pump 14 so as to cool the pump mechanics and motor. Water exits the high-pressure pump 14 at a pressure of from about 2000 psi to about 30000 psi, from about 3000 psi to about 25000 psi, from about 5000 psi to about 20000 psi, from about 7500 psi to about 15000 psi, and from about 5000 psi to about 10000 psi. For safety of the operator, the water line 22 exiting the high-pressure pump 14 includes a pressure switch 24. In a preferred embodiment, the pressure switch is time delayed. Further, the water line 22 exiting the high-pressure pump includes at least one of each of pressure unloader 26, a pressure regulating valve 28, a safety relief valve 30, a flow switch 32, and combinations thereof. As one of skill in the art would appreciate, sizing and number of these components depends of the pressure load of the pressure washing system. In an embodiment of the disclosure, any number of the pressure unloader 26, a pressure regulating valve 28, a safety relief valve 30, a flow switch 32, and combinations thereof, may be included on water lines, heating modules, pumps, and the like in order to the improve the safety of the system. The water line 22 exiting the high-pressure pump 14 is in fluid communication with and enters at least one heating module 34.

In an embodiment of the disclosure, the heating module 34 comprises a coil in fluid communication with the water line 22. The water in the system passed through the coil contained within an electric heating module. According to an aspect of the invention, any suitable heating module may be used, including, but not limited to an electric cartridge, electric blanket, an electric source, and combinations thereof.

In an aspect of the disclosure, heat is provided only by electricity and the system is free of alternative heat transfer equipment such as conventional liquid shell and tube heat exchangers. In a further aspect of the disclosure, electricity is the only energy input and no additional fuel sources are required for energy production.

The heating module(s) 34 according to the disclosure is powered in an amount sufficient to provide adequate heat transfer to raise the temperature of the water of the system to the desired temperature, ranging from about 50° F. (10° C.) to about 320° F. (160° C.). The electrical coils are designed in such a way that maximizes surface area contacting the water, thus optimizing time in which heat transfer occurs. Any suitable material may be used to form the coils and to construct the heating module. In an aspect of the disclosure, the heating modules are jacketed to provide insulation from other components of the system and to increase heat transfer within the heating module. It is an object of the disclosure to provide efficient and quick heating to desired temperatures.

Figure 2:
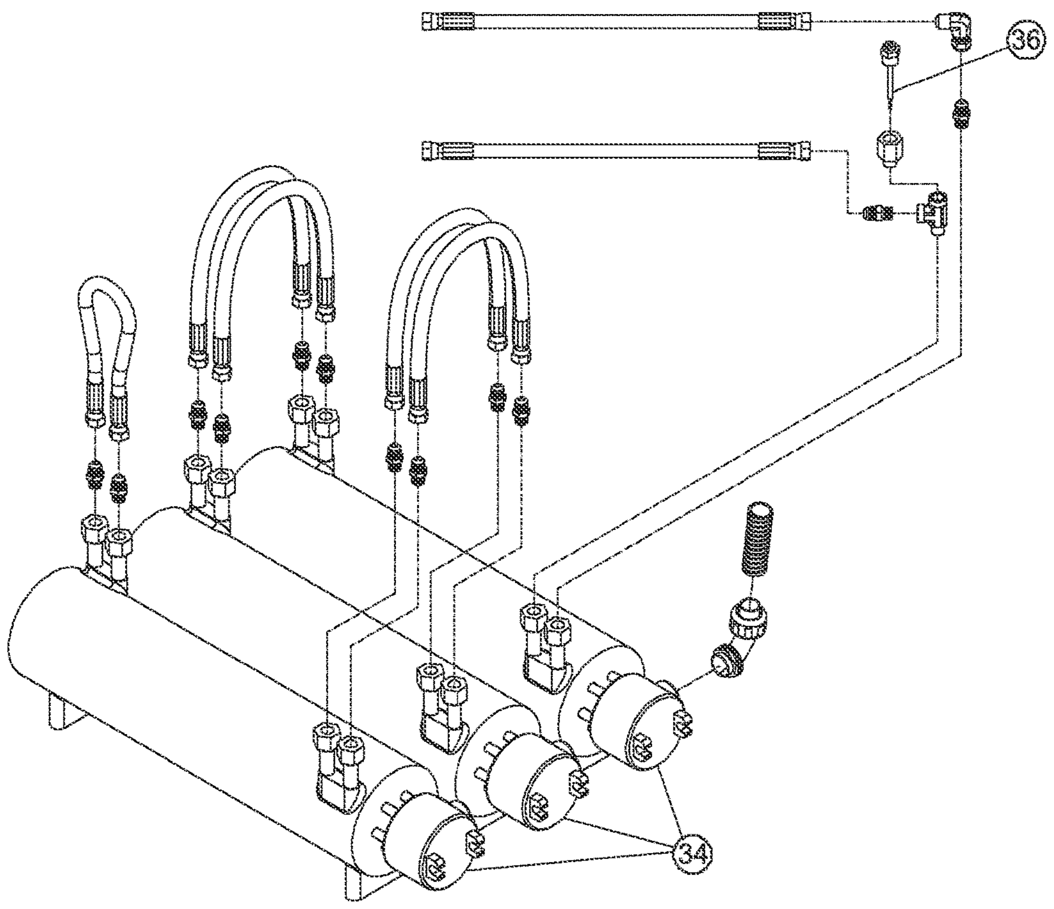
FIG. 2 shows an embodiment of the all-electric heating module according to the present disclosure.

As shown in FIG. 2, more than one heating module 34 may be used in embodiments of the disclosure. In one embodiment of the disclosure, multiple heating modules are arranged in parallel fluid communication. In a further embodiment of the disclosure, multiple heating modules are arranged in series fluid communication. In an aspect of the disclosure, each of the each of the heating modules may include a thermostat 36 for determine heating of each respective coil, heating module, inlet temperature, and outlet temperature.

Figure 3:
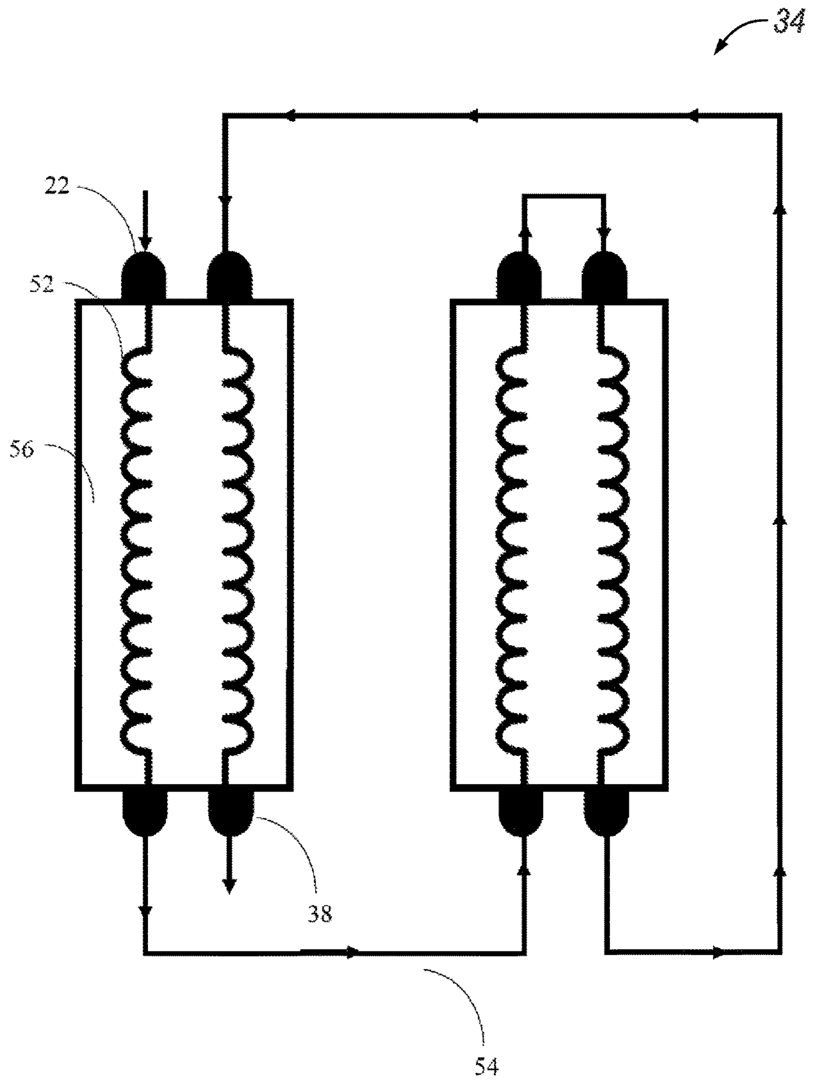
FIG. 3 shows an embodiment of the arrangement of two heating modules.
Figure 4:
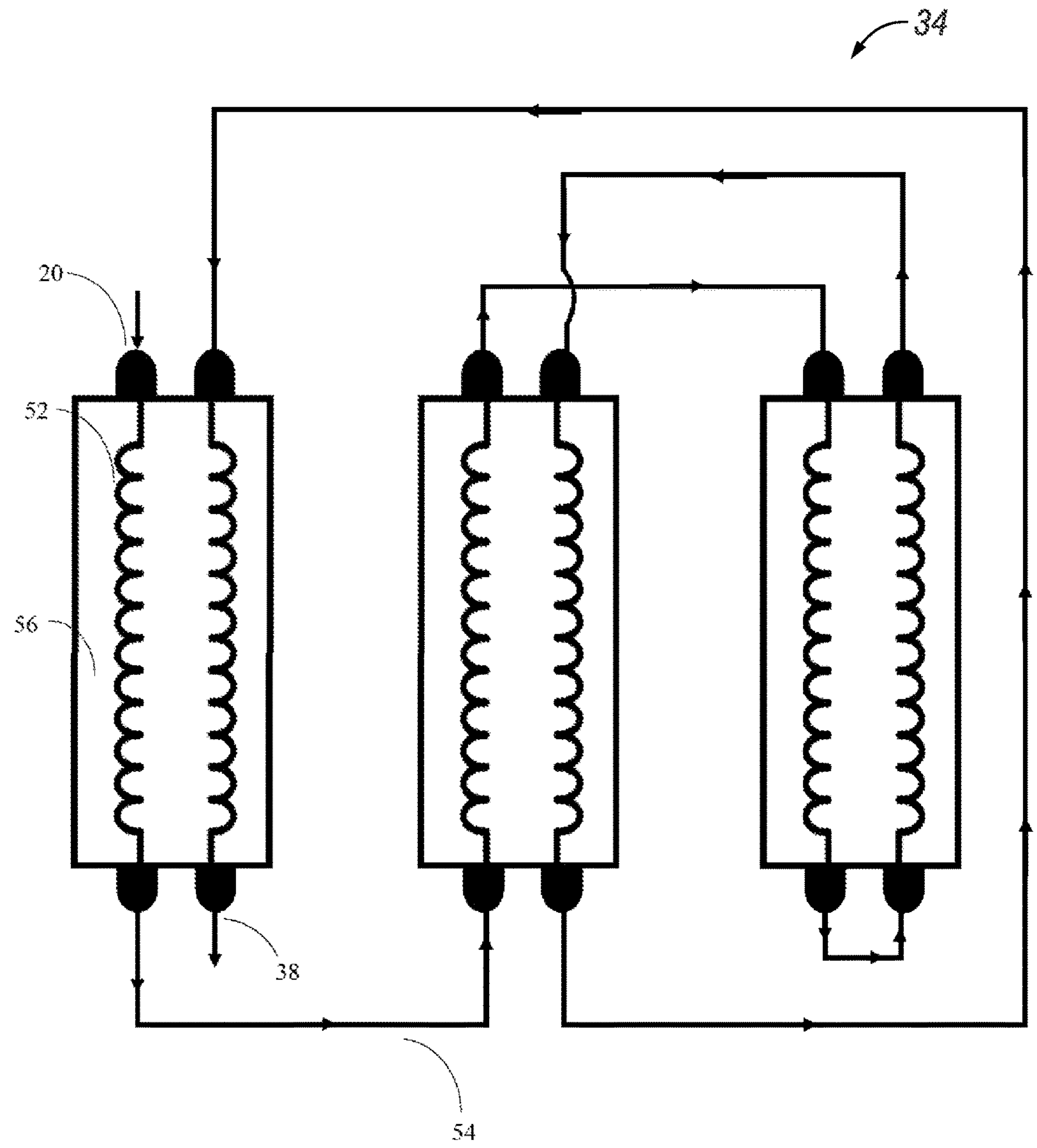
FIG. 4 shows an embodiment of the arrangement of three heating modules.
Figure 5:
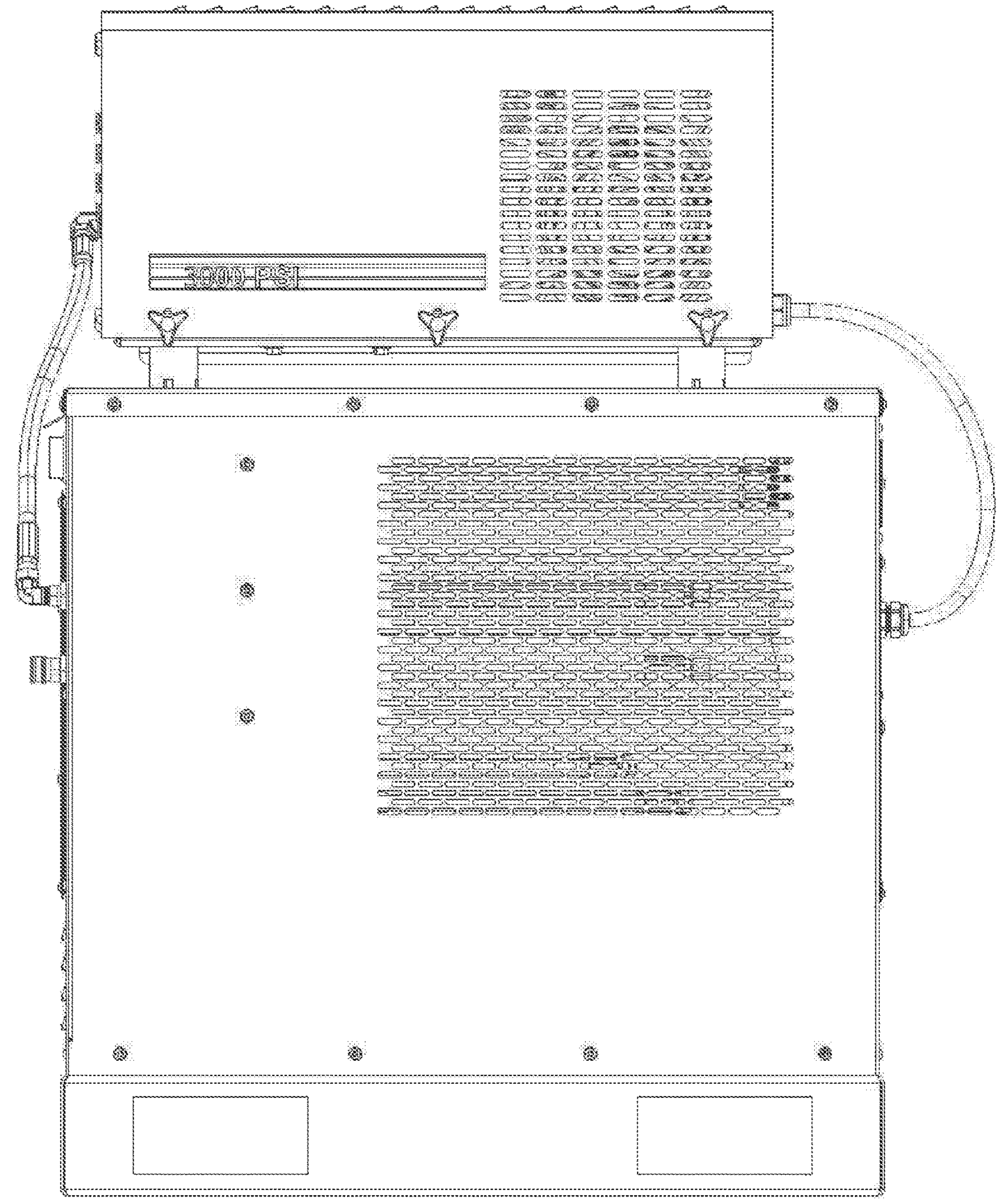
FIG. 5 shows a right-side view of the system module according to the present disclosure.
Figure 6:
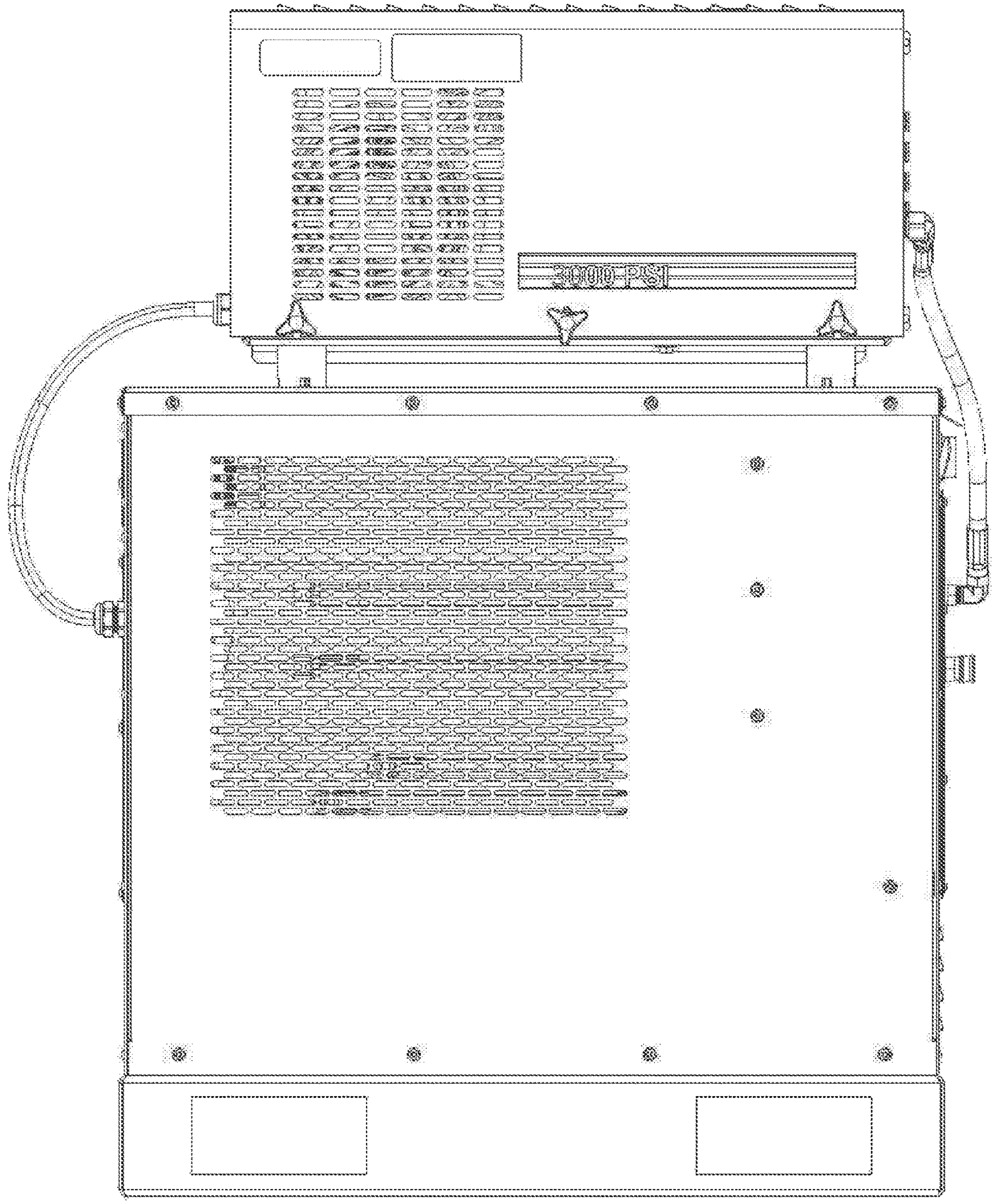
FIG. 6 shows a left-side view of the system module according to the present disclosure.
Figure 7:
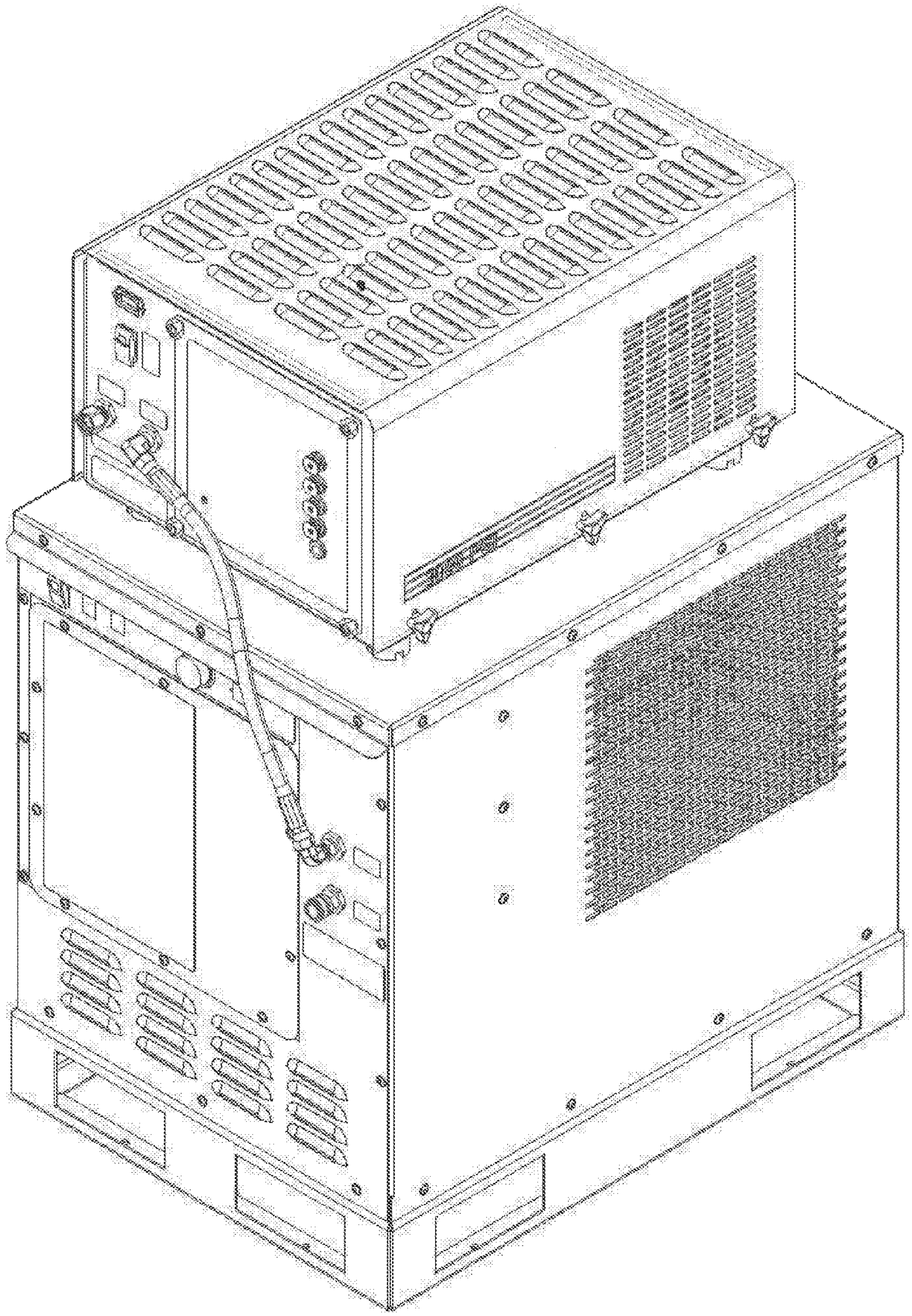
FIG. 7 shows a perspective view of the system module according to the present disclosure.
Figure 8:
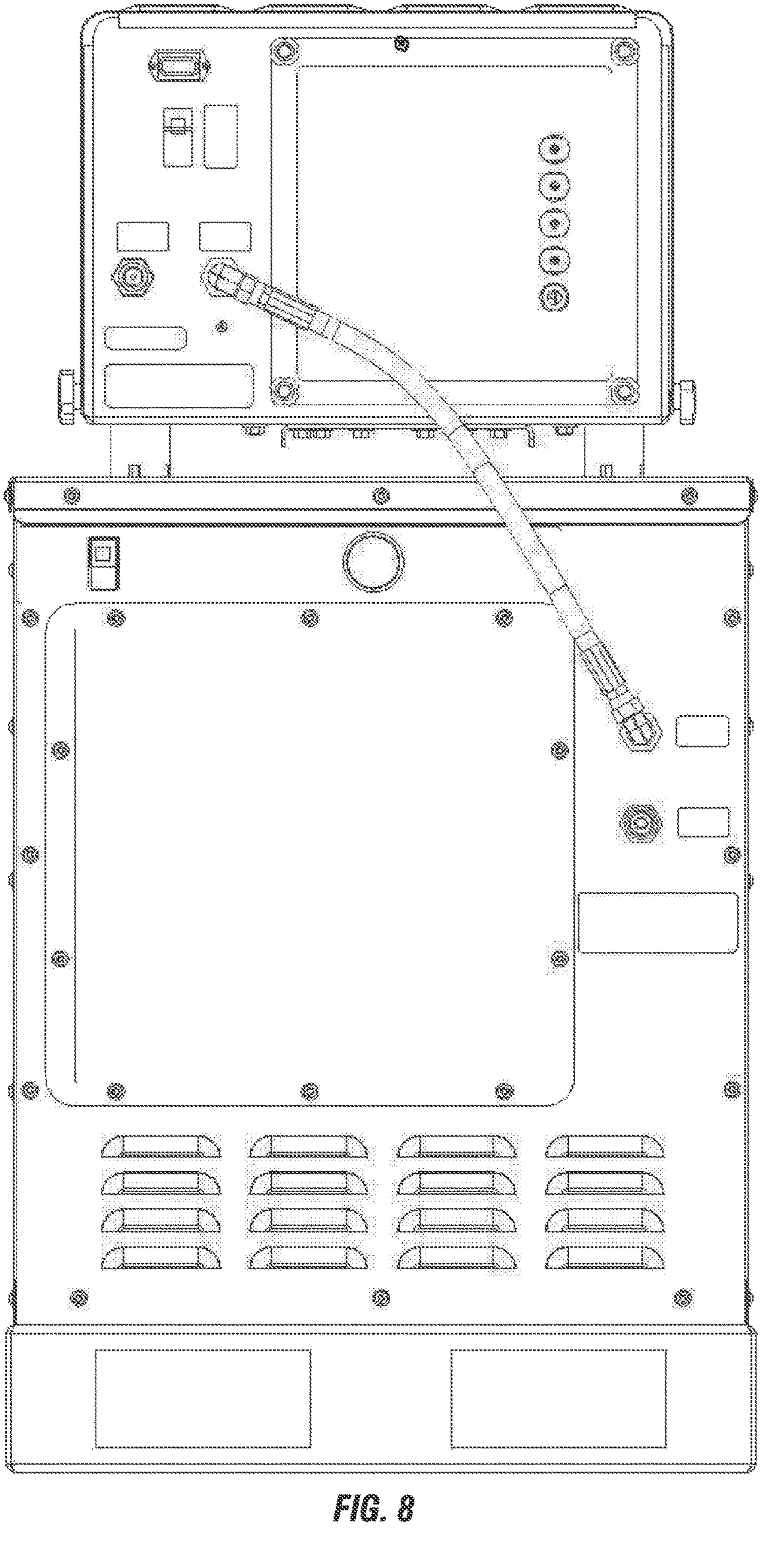
FIG. 8 shows a front view of the system module according to the present disclosure.
Figure 9:
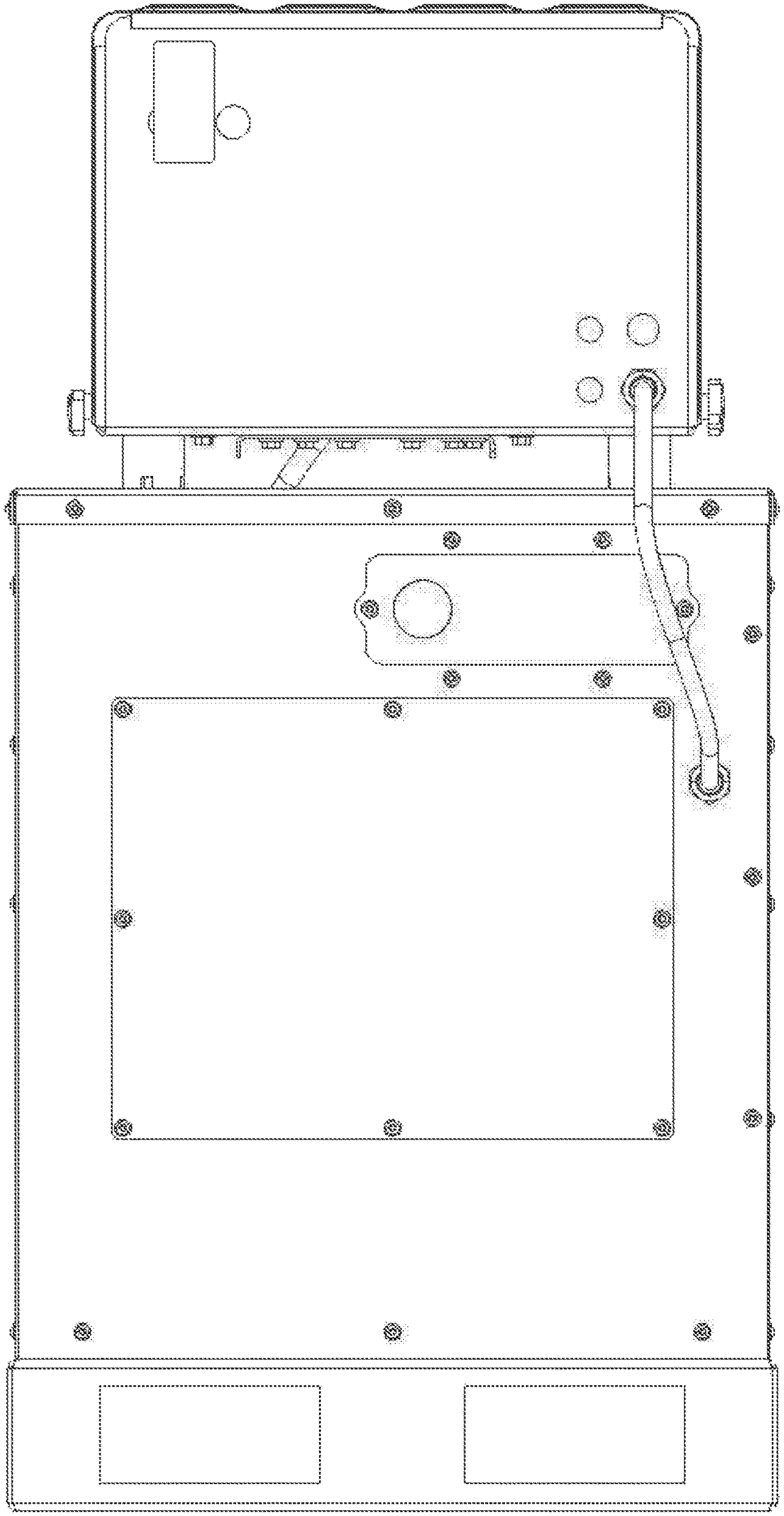
FIG. 9 shows a back view of the system module according to the present disclosure.

A non-limiting embodiment of the arrangement of two heating modules is shown in FIG. 3. The water line 22 exiting the high-pressure pump enters a heating module 34. In a preferred embodiment, the heating module comprises at least one coil 52 and a solid-state heating element 56. While passing through a coil, the water of the system is heated to a particular temperature in a step-wise fashion, wherein when the water exits the heating module(s) it has reached the desired temperature as selected by the operator. The water then exits the first heating module and enters the second via an external water line 54. Water is circulated through at least one, and preferably at least two coils within the second heating module. The water then exits the second heating module and returns to first heating module, where the water is passed through at least one additional coil within the first heating module before exiting the heat module via a water line 38 in fluid communication with the downstream system. A further non-limiting embodiment depicting three heating modules is shown in FIG. 4. As one of skill in the art will appreciate, principles of heat exchanger networks and optimization will apply in order to maximize efficiency and heat transfer of the system. Any suitable configuration of coils, heating modules, and external water lines may be used in order to optimize the energy use of the system, while providing efficiency and fast heating of the water within the system.

Returning to FIG. 1, water exits the heating module and/or modules via a water outlet line 38 which is in fluid communication with the heating module. In further embodiment, the water outlet line 38 includes an adjustable thermostat 36, which allows the operator to adjust the desired temperature. In a further embodiment, the system includes an optional controller or software platform. The software platform provides a user or system to select a desired pressure, temperature, and detergent composition. As a result, use of the system for pressure washing provides significant user flexibility to for particular user-identified purposes. For example, the controller or control software for operation of the system may permit a user or system to select both temperature and pressure as well as amount of detergent included in the washer. In a further aspect, the control software may determine the timing, sequencing and/or selection of these parameters. In a still further aspect of the disclosure, the control system includes measurement modules, including but not limited to thermometers, flow rate monitors such as pressure sensors or orifice plates, and the like.

According to the disclosure, the controller may further include a mechanism for manually starting/stopping any of the same functions, including for example a manual switch panel for the same. In addition to manual controls, such as a manual switch panel, the controller preferably has buttons or other means for selecting particular embodiments according to option displayed by the control software platform. An embodiment of the controller may further include a display screen to assist a user in selecting wash conditions and any other options for user selection as one skilled in the art will ascertain based upon the description of the disclosure. Concomitant with the control software are user-friendly instructions for use displayed on the display screen (or the like).

In an aspect of the disclosure, the control software utilizes a control software algorithm to maximize heating within the system and provide safe operating conditions for the pumps and heating modules of the system.

In a further embodiment of the disclosure, the system comprises an inlet for detergent. Any suitable detergent may be used according to the desired substrate to be cleaned via pressure washing. The detergent is housed in a storage tank which may be internal or external to the system. The detergent enters the system via an inlet and detergent hose 40 which may include a detergent strainer 42. The detergent hose is in fluid communication with the outlet water line 38 from the heating module. In a further embodiment of the disclosure, the system comprises a detergent metering module 44, which controls the amount of detergent provided to the system. As discussed above, the detergent metering module 44 can be controlled by the optional controller. The resultant detergent and water mixture enters the trigger gun assembly via a high-pressure hose which is in fluid communication with each of the detergent hose 40, the outlet water line 38, and the trigger gun assembly 48.

The disclosures being thus described, it will be obvious that the same may be varied in many ways. Such variations are not to be regarded as a departure from the spirit and scope of the disclosures and all such modifications are intended to be included within the scope of the following claims.

The above specification provides a description of the manufacture and use of the disclosed compositions and methods. Since many embodiments can be made without departing from the spirit and scope of the disclosure, the disclosure resides in the claims.

What is claimed is:

1. A pressure washer system with an all-electric heater module for heating a liquid, comprising:

a high-pressure pump;

at least one heating module having at least one heating cartridge in communication with the high-pressure pump, said at least one heating cartridge having an inlet, an outlet, and at least one coil;

a trigger gun assembly in communication with the at least one heating module;

wherein the liquid can flow from the high-pressure pump through the inlet of the at least one heating cartridge, through the at least one coil, though the outlet of the at least one heating cartridge, to the trigger gun assembly;

wherein the liquid is heated by a heating element of the heating module prior to being sent to the trigger gun assembly.

2. The system according to claim 1, further comprising at least one additional heating cartridge in communication with a first heating cartridge.

3. The system according to claim 2, wherein the heating cartridges are arranged in series.

4. The system according to claim 2, wherein the heating cartridges are arranged in parallel.

5. The system according to claim 1, further comprising a measurement module, wherein said measurement module is selected from the group consisting of flow monitors, pressure sensors, and thermometers and combinations thereof.

6. The system of claim 1, wherein the heating element is selected from the group consisting of an electric cartridge, electric blanket, an electric source, and combinations thereof.

7. The system according to claim 1, further comprising a controller for operating said system to select a desired pressure, temperature, or detergent composition.

8. The system according to claim 1, further comprising a pressure unloader, a pressure regulating valve, a safety relief valve, or a flow switch.

9. The system according to claim 1, wherein said heating module maintains a temperature from about 50° F. to about 320° F.

10. The system according to claim 1, wherein said high-pressure pump maintains a pressure of about 2000 psi to about 30000 psi.

11. The system to claim 10, wherein said high-pressure pump maintains a pressure of about 5000 psi to about 10000 psi.

12. An all-electric pressure washer heater module in combination with at least one identical all-electric pressure washer heater module, comprising:

a first heating cartridge with an inlet and an outlet;

the cartridge having at least one coil positioned downstream from the inlet and upstream from the outlet; and the cartridge having a heating element;

at least one identical all-electric pressure washer heater module having the elements identified above;

wherein the inlet of the at least one identical all-electric pressure washer heater module is fluidly connected to the outlet of the first heating cartridge or an outlet of another identical all-electric pressure washer heater module.

13. The module according to claim 12, wherein a liquid can flow through the at least one coil and the liquid is heated by the heating element.

14. The module according to claim 12, wherein the heating element is selected from the group consisting of an electric cartridge, electric blanket, an electric source, and combinations thereof.

15. The module according to claim 13, wherein the heating element is an electric cartridge.

16. The module according to claim 12, heating module maintains a temperature from about 50° F. to about 320° F.

17. The module according to claim 12, further comprising a pressure unloader, a pressure regulating valve, a safety relief valve, or a flow switch.

18. A method of using an all-electric pressure washer heater module, comprising:

(a) providing a heating module with a heating element;

(b) liquid entering a first heating cartridge via an inlet and entering a first coil within the first heating cartridge;

(c) the liquid exiting the first heating cartridge via an outlet;

(d) the liquid entering a second heating cartridge via an inlet and entering a first coil within the second heating cartridge;

(e) the liquid exiting the first coil within the second heating cartridge via an outlet and entering a second coil within the second heating cartridge via an inlet;

(f) the liquid exiting the second coil within the second heating cartridge via an outlet and entering a second coil within the first heating cartridge via an inlet; and (g) the liquid existing the second heating coil within the first heating cartridge via an outlet, wherein the liquid is heated to a desired temperature and provided to the downstream system.

19. A method of using an all-electric pressure washer heater module, comprising:

(a) providing a heating module with a heating element;

(b) liquid entering a first heating cartridge via an inlet and entering a first coil within the first heating cartridge;

(c) the liquid exiting the first heating cartridge via an outlet;

(d) the liquid entering a second heating cartridge via an inlet and entering a first coil within the second heating cartridge;

(e) the liquid exiting the first coil within the second heating cartridge via an outlet and entering a first coil within a third heating cartridge via an inlet;

(f) the liquid exiting the first coil within the third heating cartridge via an outlet and entering a second coil within the third heating cartridge via an inlet;

(g) the liquid exiting the second coil within the third heating cartridge via an outlet and entering a second coil within the second heating cartridge via an inlet;

(h) the liquid exiting the second coil within the second heating cartridge via an outlet and entering a second coil within the first heating cartridge via an inlet; and (i) the liquid exiting the second heating coil within the first heating cartridge via an outlet, wherein the liquid is heated to a desired temperature and provided to the downstream system.

* * * * *